United States Patent [19]

Brunelle et al.

[11] 4,378,307

[45] Mar. 29, 1983

[54] POLLUTION CONTROL CATALYST FOR INTERNAL COMBUSTION ENGINE EXHAUST SYSTEM/CATALYTIC CONVERTER

[75] Inventors: Jean-Pierre Brunelle, Saint-Brice Sous-Foret; Philippe Courty, Houilles; Michel Prigent, Rueil-Malmaison; Bernard Raynal, Montesson, all of France

[73] Assignee: Procatalyse, Rueil-Malmaison, France

[21] Appl. No.: 187,761

[22] Filed: Sep. 16, 1980

[30] Foreign Application Priority Data

Oct. 4, 1979 [FR] France .................................. 79 24675

[51] Int. Cl.$^3$ ........................ B01J 23/10; B01J 23/42; B01J 23/44; B01J 23/74
[52] U.S. Cl. ................................ 252/455 R; 252/460; 252/462; 423/213.5
[58] Field of Search .................... 252/460, 462, 455 R; 423/213.5

[56] References Cited

U.S. PATENT DOCUMENTS 3,840,471 10/1974 Acres .............................. 252/462 X
3,929,965 12/1975 Kim et al. ......................... 423/213.5
4,162,235 7/1979 Acres et al. .................. 423/213.5 X
4,171,288 10/1979 Keith et al. ........................ 252/462
4,283,308 8/1981 Ohara et al. .................... 252/462 X Primary Examiner—W. J. Shine
Attorney, Agent, or Firm—Burns, Doane, Swecker & Mathis

[57] ABSTRACT

A pollution control catalyst for a catalytic converter comprising the exhaust system of an internal combustion engine, said catalyst including a refractory oxide support, and an activated phase therefor comprised of 0.3 to 7% by weight cerium based upon the weight of said support, 0.1 to 3.5% by weight iron, also based upon the weight of said support, at least one platinum or palladium metal, and at least one iridium or rhodium metal.

20 Claims, No Drawings

POLLUTION CONTROL CATALYST FOR INTERNAL COMBUSTION ENGINE EXHAUST SYSTEM/CATALYTIC CONVERTER

BACKGROUND OF THE INVENTION

1. Field of the Invention

The present invention relates to novel polyfunctional catalysts, and, more especially, to novel polyfunctional catalysts useful for the treatment of the exhaust gases and fumes emanating from internal combustion engines.

As utilized herein, by the term "polyfunctional catalysts" there are intended those catalysts which effect the oxidation of, in particular, carbon monoxide and the hydrocarbons present in internal combustion engine exhaust gases, as well as the simultaneous reduction of, in particular, the nitrogen oxides ($NO_x$) present in such gases.

2. Description of the Prior Art

In gasoline internal combustion engines, the composition of the exhaust gases can be controlled vis-a-vis stoichiometric equilibrium in such fashion that the oxidation and the catalytic reduction of the various constituents of equilibrium afford water, carbon dioxide and nitrogen. And the means typically employed for regulating, or adjusting the composition of the exhaust gas vis-a-vis stoichiometric equilibrium are, notably, the continuous regulation of the air/fuel ratio fed into the engine, and/or the introduction of additional oxygen upstream of the catalyst. The composition of the exhaust gases thus varies, over periods on the order of one second, from a composition containing a relative excess of the oxidizing compounds (a so-called "lean" setting) to a composition containing an excess of reducing compounds (a so-called "rich" setting), and vice-versa.

In particular, the so-called "lean" setting is such that the amounts of oxygen and nitrogen oxide present are greater than those required to bring about the total oxidation of the carbon monoxide, hydrocarbons and hydrogen present. Conversely, and specifically, the so-called "rich" setting is such that the amounts of carbon monoxide, hydrocarbons and hydrogen present are greater than those required to bring about the total reduction of the oxygen and nitrogen oxides present.

Anti-pollution catalysts for treating such exhaust gases have already been proposed to this art. Thus, according to the *Journal of Catalysis*, 56, 321 (1979) and the 6th *North-American Congress of the Catalysis Society*, Chicago, March 1979, Communication H4, polyfunctional catalysts comprising cerium oxide and precious metals as the active phase are known.

And according to published Japanese Patent Application No. 3062-777, polyfunctional catalysts comprising iron oxide and previous metals as the active phase are also known.

However, such catalysts have proven to display insufficient initial activity, as well as insufficient stability over prolonged periods of time to conform to current anti-pollution requirements and standards.

SUMMARY OF THE INVENTION

Accordingly, a major object of the present invention is the provision of a novel polyfunctional catalyst comprising iron, cerium and precious metals, which catalyst overcomes not only the aforenoted disadvantages exhibited by the prior art anti-pollution catalysts, but which surprisingly is characterized by excellent activity as well as marked stability over prolonged periods of time.

Briefly, the present invention features a polyfunctional catalyst comprising a refractory oxide support, or carrier, and an active phase comprising cerium, iron, at least one metal selected from the group consisting of platinum and palladium, and at least one metal selected from the group consisting of iridium and rhodium.

The refractory oxide support which is employed according to the invention is notably silica, alumina, aluminosilicates or mixed oxides comprising, for example, alumina in combination with silica, with zirconium oxide, with cerium oxide and/or with titanium oxide.

DETAILED DESCRIPTION OF THE INVENTION

More particularly according to this invention, an alumina support is preferred. Such support, moreover, preferably has a specific surface area of between 25 and 250 $m^2/g$ and more preferably between 70 and 150 $m^2/g$. Same also has a total pore volume which is preferably between 0.5 and 2 $cm^3/g$ and more preferably between 0.8 and 1.7 $cm^3/g$. Too, same preferably has a macroporosity such that the pore volume of those pores having a diameter greater than 1,000 Å is between about 0.05 and 0.6 $cm^3/g$ and preferably between 0.2 and 0.5 $cm^3/g$.

Such supports are facilely produced from active alumina which has been obtained in accordance with the process described in U.S. Pat. No. 2,915,365 and agglomerated in accordance with the process described in U.S. Pat. No. 2,881,051.

Same can also be produced by autoclaving the above agglomerates in a neutral or acid medium, followed by drying and calcining, as per French Pat. Nos. 1,449,904 and 1,386,364.

The subject supports can also be prepared according to the process described in French Patent Application No. 77/23,880 published under U.S. Pat. No. 2,399,276.

The alumina supports according to the invention too can be produced according to the process described in French Patent Application No. 79/04,810. According to this particular process, alumina beads having the required characteristics are produced in accordance with the following sequence:

(i) An ultrafine boehmite or pseudo-boehmite sol, the boehmite sol being free from amorphous alumina and the concentration by weight of the sol, expressed as $Al_2O_3$, being between 10 and 25% is mixed, at a pH below 7.5 and preferably of between 4 and 7, with between 30 and 95% by weight (based on total solids) of spheroidal alumina particles which are essentially in the form of at least one of the phases selected from the group consisting of the gamma, delta and theta phases; these particles having a micropore volume of between 0.4 and 1 $cm^3/g$ and preferably between 0.7 and 1 $cm^3/g$, and a specific surface area of between about 100 and 350 $m^2/g$, the diameter of the particles being between about 1 and 50 microns and preferably such that at least 50% of the spheroidal particles have a diameter $\phi$ and a mean value $\phi_M$ such that $\phi = \phi_M \pm 20\%$ $\phi_M$;

(ii) Droplets of the thus obtained mixture are next spheroidally shaped and gelled, preferably in accordance with the so-called "oil-drop" technique which is well-known to those skilled in the art; and (iii) The gelled beads are thence isolated, dried and calcined at a temperature of between about 550° and 1,100° C.

The ultrafine boehmite sol employed can be obtained by heating an aqueous dispersion of alumina in the presence of a monovalent strong acid radical, the aqueous alumina dispersion having been prepared from basic aluminum chloride, basic aluminum nitrate, aluminum hydroxide, alumina gel or colloidal alumina solutions.

The ultrafine boehmite sol employed can also be obtained, preferably by ripening or aging, at a temperature between 60° and 150° C., a suspension or a cake of amorphous hydrated alumina gel containing up to 35% by weight of alumina, calculated as $Al_2O_3$, and an amount of monovalent acid ions ranging from 0.05 to 0.5 mol per mol of such alumina, calculated as $Al_2O_3$, for a period of 15 hours to 10 days, the cake having been obtained by draining, washing and filtering off the alumina gel continuously precipitated, at a pH of between 8 and 9, from a solution of sodium aluminate and a solution of nitric acid.

The spheroidal particles employed can also be prepared in accordance with one of the following techniques:

(1) Precipitation of an aqueous solution of an aluminum salt by means of an alkali metal aluminate solution, atomization of the precipitate thus obtained followed by resuspension in an aqueous solution having a pH of between 4.5 and 7, atomization and drying of the resulting alumina slurry, followed by washing, drying and calcining, at a temperature of between 550° and 1,100° C., of the product obtained;

(2) Precipitation of an alumina gel at a pH of between 7.5 and 11, washing, draining, resuspending, rapid drying of the suspension in a stream of hot gases having an inlet temperature of between about 350° and 1,000° C., and calcination, at a temperature of between 550° and 1,100° C., of the product obtained;

(3) Precipitation of an alumina gel at a pH of between 7 and 10.5, ripening or aging of the precipitate at a pH of between 10 and 11, homogenization, and atomization at 250°–550° C. of the slurry obtained, and calcination, at a temperature of between 550° and 1,100° C., of the product obtained;

(4) Precipitation of an alkali metal aluminate with an inorganic acid at a temperature of between 30° and 75° C., ripening or aging in a second reactor at 30°–75° C. at a pH of about 7, recycling of the slurry obtained into the mixer-reactor, filtering, washing, spray-drying and calcination, at a temperature of between 550° and 1,100° C., of the product obtained;

(5) Atomization and calcination, at a temperature of between 550° and 1,100° C., of aqueous suspensions of ultrafine boehmite, of pseudo-boehmite and/or amorphous alumina; and (6) Treatment of aqueous dispersions of ultrafine boehmite, pseudo-boehmite and/or amorphous alumina with a base which can be decomposed into volatile products, followed by drying and calcination at a temperature of between 550° and 1,100° C.

The spheroidal alumina particles too can be prepared in accordance with the process which comprises the following steps:

(7) Preparation of an aqueous dispersion of alumina which is at least partially in the form of ultrafine boehmite, by treating an active alumina powder, which is but poorly crystallized and/or amorphous in structure, in an aqueous medium having a pH below 9, the active alumina having preferably been obtained by a rapid dehydration of aluminum hydroxides or oxide-hydroxides in a stream of hot gas, and optional treatment of the suspension with a base which can be decomposed into volatile products.

Quite generally, the supports based on alumina which are employed according to the invention can be treated, as is well-known to those skilled in the art, with pore-forming agents, such as those based on cellulose, naphthalene, natural gums, synthetic polymers and the like, such as to impart to them the desired porosity properties.

Furthermore, the supports can advantageously be treated such as to impart to them good heat stability over prolonged periods of time, in a manner which is also well-known to those skilled in the art. These treatments, in particular, consist of introducing into the supports alkaline-earth metals, silica and/or trivalent rare earths. The stabilized supports described in French Pat. Nos. 2,257,335 and 2,290,950, assigned to the assignee hereof, are especially suitable.

The content, in the catalyst, of the metals of the group consisting of platinum and palladium advantageously varies between about 0.04 and 0.5% by weight relative to the support and preferably between about 0.05 and 0.15% by weight. The content of the metals of the group consisting of iridium and rhodium advantageously varies between about 0.002 and 0.1% by weight and preferably between about 0.005 and 0.02% by weight.

According to a one embodiment of the catalyst according to the invention, the use of rhodium together with platinum and/or palladium is preferred.

The iron content of the catalyst according to the invention is between about 0.1 and 3.5% by weight relative to the support and preferably between 0.5 and 2%.

The cerium content of the catalyst according to the invention is between about 0.3 to 7.0%, and preferably 0.3 to 4.4% by weight relative to the support.

The ratio of the weight of iron to the weight of cerium is thus between about 0.02 and 12.

According to another embodiment of the invention, the catalysts can furthermore contain at least one of the following metals: copper, nickel, manganese, tin, germanium, uranium and rhenium. The total content of these metals, by weight relative to the support, is between about 0.5 and 5%.

The catalysts according to the invention can be prepared in accordance with the usual methods, namely, either by impregnation of the support or by introduction of the metals comprising the active phase during the actual production of the support.

The preferred process is to impregnate the support with a solution of inorganic or organic compounds of the metals sought to be incorporated. The impregnation can be carried out with conjoint solutions of the metals, or successively using different solutions.

According to a preferred embodiment, the support is successively impregnated with a solution containing iron compounds and cerium compounds and then with one or more solutions containing compounds of the precious metals sought to be incorporated.

Exemplary of the compounds of iron and of cerium which can be employed are the salts of iron and of cerium, more particularly ferric nitrate, ammoniacal iron citrate, ferric chloride, cerous nitrate, cerous acetate, cerous chloride and ammoniacal ceric nitrate.

Exemplary of the compounds of rhodium, of platinum and of palladium which can be employed are hydrated rhodium trichloride, chloroplatinic acid, palladium chloride, palladium nitrate, rhodium-III-chloropentamine dichloride, platinum-II dichloride and palladium-II-tetramine dichloride.

The depth or extent of impregnation can advantageously be regulated or controlled by following procedures per se known to those skilled in the art and in particular by adding to the solution of the precious metals a certain amount of an inorganic or organic acid. Usually, nitric acid, hydrochloric acid and hydrofluoric acid, or acetic acid, citric acid and oxalic acid, are employed for such purpose.

After impregnation of the support, the catalyst is dried and then activated in a stream of air at a temperature of between about 300° and 800° C. for several hours.

The activation of the catalyst can advantageously be carried out in a reducing atmosphere at a temperature of between about 200° and 700° C.; exemplary reducing agents are, for for example, hydrogen, carbon monoxide and/or hydrogen sulfide.

It too has been determined that the catalysts according to the invention make it possible to eliminate, very efficiently, the greater portion of the carbon monoxide, uncombusted hydrocarbons and nitrogen oxides present in the exhaust gases of internal combustion engines and that, furthermore, same are characterized by marked stability over prolonged periods of time.

In order to further illustrate the present invention and the advantages thereof, the following specific examples are given, it being understood that same are intended only as illustrative and in nowise limitative.

EXAMPLE 1

Preparation of a catalyst (A) according to the invention:

100 g of alumina beads having the gamma-structure were prepared in accordance with the process described in French Pat. No. 1,449,904, by autoclaving active alumina agglomerates in the presence of an acid, and drying and calcining the product. These beads have a specific surface area of 100 m$^2$/g, a total pore volume of 0.90 cm$^3$/g and a macropore volume, i.e., those pores having a diameter greater than 1,000 Å, of 0.30 cm$^3$/g.

These beads were impregnated with 90 cm$^3$ of an aqueous solution of ferric nitrate and of cerous nitrate, containing 1 g of iron and 3.5 g of cerium.

After being maintained in contact with such solution for 30 minutes, the beads were dried at 150° C. and then calcined in air at 600° C. for 3 hours.

Same were then impregnated with 90 cm$^3$ of a solution of chloroplatinic acid and of hydrated rhodium trichloride, containing 73 mg of platinum and 7.3 mg of rhodium.

After being maintained in contact with the solution for 30 minutes, the beads were dried at 150° C. and then activated at 400° C. for 3 hours in a stream of hydrogen flowing at the rate of 200 liters per hour.

The catalyst (A) thus prepared contained the following, by weight, relative to the support: 0.073% of platinum, 0.0073% of rhodium, 1% of iron and 3.5% of cerium.

EXAMPLE 2

Preparation of a catalyst (B) according to the invention:

100 g of alumina beads were prepared in accordance with the process described in French Patent Application No. 79/04,810. These beads had a specific surface area of 100 m$^2$/g, a total pore volume of 1.20 cm$^3$/g and a macropore volume, i.e., those pores having a diameter greater than 1,000 Å, of 0.45 cm$^3$/g.

The procedure used for impregnation was similar to that described in Example 1, except that 120 cm$^3$ of an aqueous solution of ferric nitrate and of cerous nitrate, containing 1 g of iron and 3.5 g of cerium, were employed, followed by 120 cm$^3$ of a solution of chloroplatinic acid and hydrated rhodium trichloride containing 90 mg of platinum and 9 mg of rhodium.

The catalyst (B) thus prepared contained the following, by weight, relative to the support: 0.09% of platinum, 0.009% of rhodium, 1% of iron and 3.5% of cerium.

EXAMPLE 3

Preparation of a prior art catalyst (C):

100 g of alumina beads as described in Example 1 were impregnated with 90 cm$^3$ of an aqueous ferric nitrate solution containing 4.5 g of iron. After being maintained in contact with the solution for 30 minutes, the beads were dried at 150° C. and then calcined in air at 600° C. for 3 hours. Same were then impregnated with 90 cm$^3$ of a solution of chloroplatinic acid and hydrated rhodium trichloride containing 73 mg of platinum and 7.3 mg of rhodium. After being maintained in contact with the solution for 30 minutes, the beads were dried at 150° C. and then activated for 3 hours at 400° C. in a stream of hydrogen flowing at a rate of 200 liters per hour.

The catalyst (C) thus prepared contained the following, by weight, relative to the support: 0.073% of platinum, 0.0073% of rhodium and 4.5% of iron.

EXAMPLE 4

Preparation of a prior art catalyst (D):

The procedure followed was that of Example 3, except that during the first impregnation of the alumina beads a solution of cerous nitrate was used in place of the solution of ferric nitrate. The cerous nitrate solution contained 4.5 g of cerium.

The catalyst (D) thus prepared contained the following, by weight, relative to the support: 0.073% of platinum, 0.0073% of rhodium and 4.5% of cerium.

EXAMPLE 5

Preparation of a catalyst (E) according to the invention:

Catalyst (E) differed from catalyst (A), the preparation of which having been described in Example 1, in having different iron and cerium contents.

In preparing the catalyst (E), the procedure followed was similar to that described in Example 1, but employing a first impregnation solution of ferric nitrate and cerous nitrate containing 2 g of iron and 3.5 g of cerium; the remainder of the preparation was identical to that of Example 1.

The catalyst (E) thus obtained contained the following, by weight, relative to the support: 0.073% of platinum, 0.0073% of rhodium, 2% of iron and 2.5% of cerium.

EXAMPLE 6

Preparation of a catalyst (F) having iron and cerium contents without the scope of the invention:

The present example, given by way of comparison, illustrates the preparation of a catalyst, the iron and cerium contents of which are without the scope of the invention. Such a catalyst not only exhibited catalytic properties which were far inferior to those of the catalysts of the invention, but proved economically of little value because of the large amounts of metals employed.

In preparing the catalyst (F), a procedure similar to that described in Example 1 was followed, but employing a first impregnation solution of ferric nitrate and cerous nitrate containing 5 g of iron and (7.5) g of cerium; the remainder of the preparation was identical to that of Example 1.

The catalyst (F) thus obtained contained the following, by weight, relative to the support: 0.073% of platinum, 0.0073% of rhodium, 5% of iron and (7.5%) of cerium.

EXAMPLE 7

Preparation of a catalyst (G) according to the invention:

100 g of alumina beads as described in Example 1 were impregnated with 90 cm$^3$ of an aqueous solution of ferric nitrate, cerous nitrate and manganese nitrate containing 1 g of iron, 3.5 g of cerium and 1 g of manganese.

After being maintained in contact with the solution for 30 minutes, the beads were dried at 150° C. and then calcined in air at 600° C. for 3 hours. Same were then impregnated with 90 cm$^3$ of a solution of chloroplatinic acid and hydrated rhodium trichloride containing 73 mg of platinum and 7.3 mg of rhodium. After being maintained in contact with the solution for 30 minutes, the beads were dried at 150° C. and then activated at 400° C. for 3 hours in a stream of hydrogen flowing at a rate of 200 liters per hour.

The catalyst (G) thus prepared contained the following, by weight, relative to the support: 0.073% of platinum, 0.0073% of rhodium, 1% of iron, 3.5% of cerium and 1% of manganese.

EXAMPLE 8

Activity of the various catalysts, measured on a test engine:

The present example combines the results obtained on a test engine utilizing the catalysts (A), (B), (C), (D), (E), (F) and (G) respectively described in Examples 1 to 7.

The tests were carried out by successively introducing 1,000 cm$^3$ of each of the catalysts into a cylindrical-type reactor having axial flow (internal diameter 14 cm, height of the catalyst bed 6.5 cm).

The reactor was fitted to the exhaust of two cylinders of a bench test engine, a device whereby the temperature of the gases can be regulated to 350° C. upon entering the reactor being interposed between the engine and the reactor.

The engine was a gasoline car engine possessing four cylinders having a total cylinder capacity of 1,600 cm$^3$, the compression ratio being 8.8/1. The engine was coupled to a hydraulic brake and operated, once stable running had been reached, at 3,000 rpm, providing a power of about 25 kW.

The fuel feed was regulated such that the ratio of the air feed and fuel feed at inlet was equal to the stoichiometric combustion ratio (richness equal to 1).

Under these conditions, the flow rate of the exhaust gases passing over the catalyst was 46 m$^3$(S.T.P.)/hour and the initial amounts of the principal pollutants were as follows:

| | |
|---|---|
| Carbon monoxide (CO): | 0.55% by volume |
| Uncombusted hydrocarbons (HC): | 0.14% by volume, expressed as the equivalent amount of methane |
| Nitrogen oxides (NO + NO$_2$): | 0.31% by volume |

The concentrations of these compounds were determined before and after passing the exhaust gases over the catalyst, by employing the following conventional analytical techniques:

| | |
|---|---|
| CO: | infrared absorption (COSMA Rubis 3000 analyzer) |
| HC: | flame ionization analysis (IPM analyzer) |
| NO + NO$_2$(NO$_x$): | chemiluminescence (Thermoelectron 10 A analyzer) |

The table which follows summarizes the results obtained under temperature conditions which permitted clear differentiation between the catalysts from the point of view of their suitability under cold-start conditions.

Table 1: Activity measured on a test engine at 350° C. and expressed as the percentage conversion of carbon monoxide (CO), hydrocarbons (HC) and nitrogen oxides (NO$_x$).

TABLE 1

| Example number | Catalyst reference | % conversion measured at 350° C. | | |
|---|---|---|---|---|
| | | CO | HC | NO$_x$ |
| 1 (invention) | A | 59 | 53 | 70 |
| 2 (invention) | B | 68 | 60 | 84 |
| 3 (comparison) | C | 10 | 9 | 13 |
| 4 (comparison) | D | 27 | 18 | 34 |
| 5 (invention) | E | 77 | 73 | 92 |
| 6 (comparison) | F | 35 | 22 | 36 |
| 7 (invention) | G | 63 | 58 | 75 |

EXAMPLE 9

Activity of the various catalysts measured on an automobile in accordance with the American CVS-CH cycle:

The present example summarizes the results obtained on an automobile in accordance with the American CVS-CH cycle, employing the various catalysts (A), (B), (C), (D), (E), (F) and (G) respectively described in Examples 1 to 7.

The conditions of this test are specified in the following publication: "*Federal Register,* Vol. 42, No. 124, June 28, 1977, pages 32,906 to 33,004; Title 40: Protection of Environment, Chap. 1, Environmental Protection Agency, Part 86 Control of air pollution from new-motor vehicles and new-motor vehicle engines".

The vehicle used was a RENAULT R 17 TS equipped with a BOSCH-L JETRONIC prototype electronic injection device regulated by an oxygen sensor. The inertia of this vehicle was 2,750 lbs (1,250 kg). The hydraulic brake which simulated the resistance to forward movement under road conditions was regulated in accordance with the U.S. Federal Standard and corresponds, on the chassis dynamometer used, to a traction force, at the balance point, of 25 kg f at 80 km/h.

Without the catalyst-containing muffler, the vehicle basically emitted the following:

CO: 12.3 g/mile
HC: 1.8 g/mile
NO$_x$: 2.4 g/mile

An experimental catalyst-containing muffler of the cylindrical type with radial flow, and having a volume of 1,700 cm$^3$, was fitted onto the exhaust pipe at a distance of about 1.7 m from the engine.

Table 2 below summarizes the results obtained with the various catalysts (A), (B), (C), (D), (E), (F) and (G) respectively described in Examples 1 to 7.

Table 2: Emission of carbon monoxide (CO), hydrocarbons (HC) and nitrogen oxide (NO$_x$), measured on an automobile, in accordance with the United States CVS-CH cycle and expressed in grams per mile.

TABLE 2

| Example number | Catalyst reference | Emission after stabilizing the catalyst on the road for 50 miles | | | Emission after aging the catalyst on a test engine for 150 hours at 600° C. | | |
|---|---|---|---|---|---|---|---|
| | | CO | HC | NO$_x$ | CO | HC | NO$_x$ |
| 1 (invention) | A | 1.19 | 0.22 | 0.27 | 2.03 | 0.24 | 0.35 |
| 2 (invention) | B | 1.04 | 0.19 | 0.22 | 1.82 | 0.22 | 0.33 |
| 3 (comparison) | C | 1.46 | 0.23 | 0.38 | 4.43 | 0.77 | 1.62 |
| 4 (comparison) | D | 1.47 | 0.25 | 0.37 | 2.50 | 0.29 | 0.63 |
| 5 (invention) | E | 0.96 | 0.21 | 0.27 | 1.92 | 0.25 | 0.38 |
| 6 (comparison) | F | 1.06 | 0.22 | 0.31 | 3.12 | 0.36 | 0.72 |
| 7 (invention) | G | 1.15 | 0.17 | 0.26 | 1.86 | 0.18 | 0.33 |

The results reported in Tables 1 and 2 clearly reflect the superiority of the catalysts (A), (B), (E) and (G) according to the invention over the catalysts (C), (D) and (F) of the prior art, both from the point of view of initial activity and of stability over a period of time.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A catalyst composition for the conversion of carbon monoxide, hydrocarbons, and nitrogen oxides comprising a refractory oxide support, and an activated phase deposited on said support consisting essentially of 0.3 to 7% by weight cerium based upon the weight of said support, 0.1 to 3.5% by weight iron, also based upon the weight of said support, at least one platinum or palladium metal, and at least one iridium or rhodium metal, the ratio of the at least one platinum or palladium metal to the at least one iridium or rhodium metal being between about 5:1 and about 250:1.

2. The catalyst composition as defined by claim 1, said support comprising a refractory oxide selected from the group consisting of silica, alumina, aluminosilicate, and the mixed oxides alumina/silica, alumina/zirconium oxide, alumina/cerium oxide, alumina/titanium oxide, and admixtures thereof.

3. The catalyst composition as defined by claim 2, said refractory oxide being alumina having a specific surface area ranging from 25 to 250 m$^2$/g, a total pore volume ranging from 0.5 to 2 cm$^3$/g, and a macropore volume, of those pores having a diameter greater than 1,000 Å, ranging from 0.05 to 0.6 cm$^3$/g.

4. The catalyst composition as defined by claim 3, said specific surface area ranging from 70 to 150 m$^2$/g, said total pore volume ranging from 0.8 and 1.7 cm$^3$/g, and said macropore volume ranging from 0.2 to 0.5 cm$^3$/g.

5. The catalyst composition as defined by claims 1 or 3, comprising from about 0.04 to 0.5% by weight of said at least one platinum or palladium metal based upon the weight of the support.

6. The catalyst composition as defined by claim 5, comprising from about 0.002 to 0.1% by weight of said at least one iridium or rhodium metal based upon the weight of the support.

7. The catalyst composition as defined by claim 6, comprising from about 0.05 to 0.15% by weight of said at least one platinum or palladium metal, and from about 0.005 to 0.02% by weight of said at least one iridium or rhodium metal.

8. The catalyst composition as defined by claim 7, comprising from about 0.5 to 2% by weight of said iron.

9. The catalyst composition as defined by claim 6, said activated phase consisting essentially of cerium, iron, rhodium and at least one platinum or palladium metal.

10. The catalyst composition as defined by claim 6, said activated phase further comprising at least one metal selected from the group consisting of copper, nickel, manganese, tin, germanium, uranium and rhenium.

11. The catalyst composition as defined by claim 10, said further at least one metal being present in an amount by weight, based upon the weight of the support, of from 0.5 to 5%.

12. The catalyst composition as defined by claim 3, said alumina support having been prepared by autoclaving agglomerates of active alumina in a neutral or acid medium, and thence drying and calcining the product resulting therefrom.

13. The catalyst composition as defined by claim 3, said alumina support having been prepared by:
 (i) mixing an ultrafine boehmite or pseudoboehmite sol, the boehmite sol being free from amorphous alumina and the concentration by weight of the sol, expressed as Al$_2$O$_3$, being between 10 and 25%, and at a pH below 7.5, with between 30 and 95% by weight total solids of spheroidal alumina particles essentially in the form of at least one of the phases selected from the group consisting of the gamma, delta and theta phases, said particles having a micropore volume of between 0.4 and 1 cm$^3$/g and a specific surface area of between about 100 and 350 m$^2$/g, and the diameters of the particles being between about 1 and 50 microns;
 (ii) spheroidally shaping and gelling into beads droplets of said resulting mixture; and
 (iii) drying and calcining said gelled beads at a temperature of between about 550° and 1,100° C.

14. The catalyst composition as defined by claim 13, the pH of mixing ranging from 4 to 7, said spheroidal alumina particles having a micropore volume ranging from 0.7 to 1 cm$^3$/g and the diameters of said particles being such that at least 50% have a diameter $\phi$ and a mean value $\phi_M$ such that $\phi = \phi_M \pm 20\% \phi_M$.

15. The catalyst composition as defined by claim 3, said alumina support having been treated with a pore-forming agent selected from the group consisting of cellulose, naphthalene, natural gum and synthetic polymer.

16. The catalyst composition as defined by claim 3, said alumina support having been heat-stabilized by means of a member selected from the group consisting of an alkaline earth metal, silica, a trivalent rare earth, and admixtures thereof.

17. The catalyst composition as defined by claims 1 or 3, comprised of 0.3 to 4.4% by weight cerium based upon the weight of said support.

18. A catalyst composition for the conversion of carbon monoxide, hydrocarbons, and nitrogen oxides comprising a refractory oxide support, and an activated phase deposited on said support consisting essentially of 0.3 to 7% by weight cerium based upon the weight of said support, 0.1 to 3.5% by weight iron, also based upon the weight of said support, at least one platinum or palladium metal, and at least one iridium metal.

19. The catalyst composition as defined by claim 1, wherein the ratio of the at least one platinum or palladium metal to the at least one iridium or rhodium metal is between about 7.5:1 and about 30:1.

20. The catalyst composition as defined by claim 1, wherein the ratio of the at least one platinum or palladium metal to the at least one iridium or rhodium metal is about 10:1.

* * * * *